Dec. 20, 1966  R. R. LOBOSCO  3,293,477
PUSH-PULL WELDING WIRE DRIVE SYSTEM
Filed Jan. 22, 1964  2 Sheets-Sheet 2
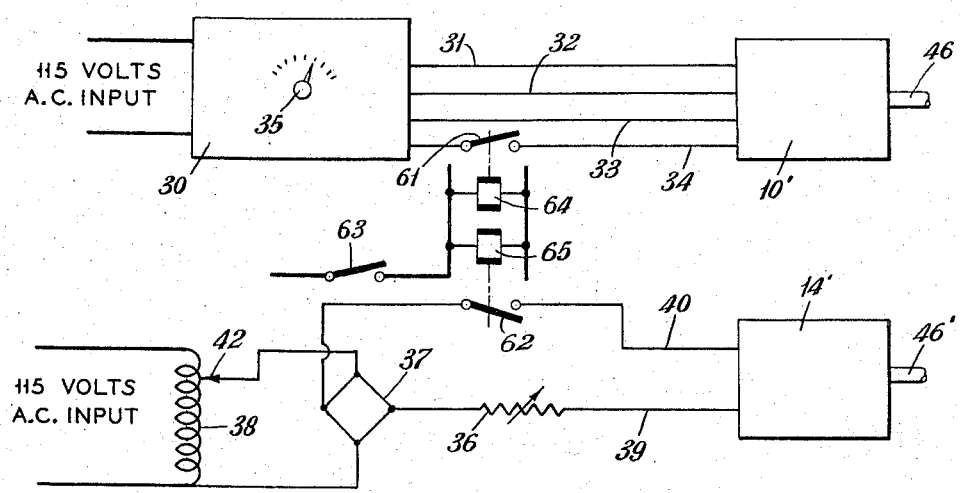
Fig. 3.
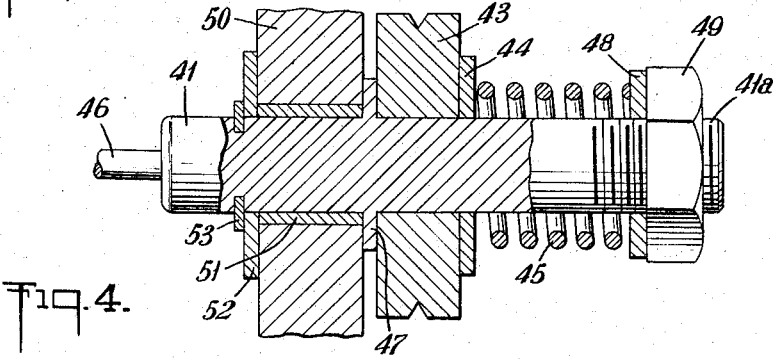
Fig. 4.
Fig. 5.
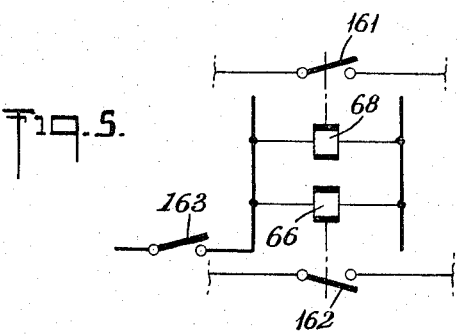
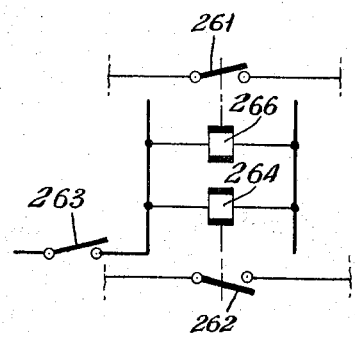
Fig. 6
INVENTOR.
ROSCOE R. LOBOSCO
BY
*William F. Mesinger*
ATTORNEY

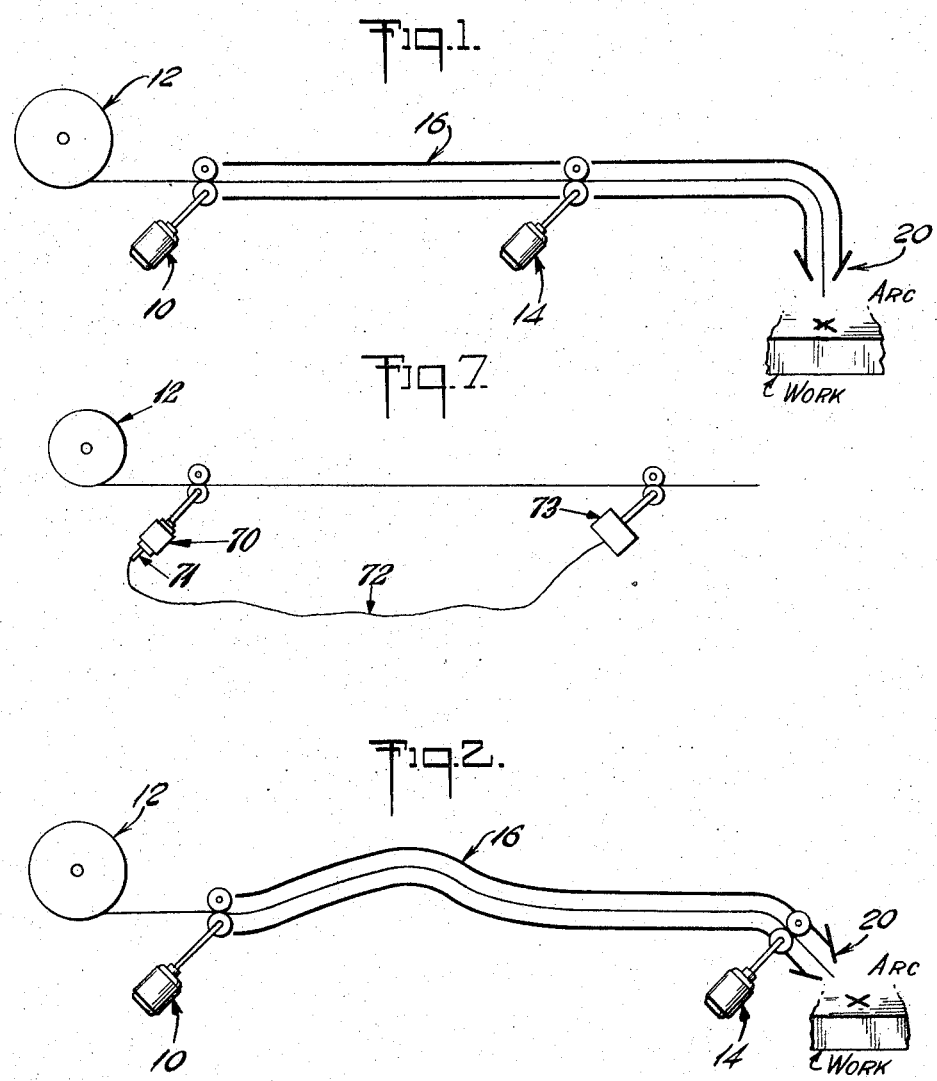

United States Patent Office 3,293,477
Patented Dec. 20, 1966

3,293,477
PUSH-PULL WELDING WIRE DRIVE SYSTEM
Roscoe R. Lobosco, Fanwood, N.J., assignor to Union
Carbide Corporation, a corporation of New York
Filed Jan. 22, 1964, Ser. No. 341,827
17 Claims. (Cl. 314—69)

This invention relates to a consumable wire electrode welding apparatus and to a method for achieving a push-pull wire feed. More particularly, it relates to such a system and apparatus which avoids certain disadvantages usually attendant with such wire feed systems.

This application is a continuation-in-part of my applications Serial No. 768,633 filed October 21, 1958, and Serial No. 216,269 filed August 1, 1962, both now abandoned.

In welding processes, wherein a consumable wire forms the electrode and supplies the filler metal, there is a problem of wire feed. Where the distance between the wire reel or spool and the arc is reasonably short, and where the wire has good column strength, the wire feed problem is minimized.

However, in many welding applications, wire is removed from a wire reel and fed into the arc at some point which is some distance from the wire reel. Up until now, it has been customary to use a single wire feed means located somewhere between the wire reel and the arc. Where the wire feed means is located near the wire reel, it is referred to as a "pusher" system and where it is located near the arc, it is referred to as a "puller" system.

In traversing the path extending from the wire reel to the arc, the wire is sometimes passed through wire guides of one form or another such as eyes, conduit, or hollow flexible cables. In many cases, this can be done without too much difficulty, but in other cases there are many problems. For example, where the distance between the wire reel and the arc is great, or where there are bends in the wire guide means, it becomes difficult to either push or pull the wire.

Where the wire is pushed, it may collapse as a column and jam in the wire guide means or wrap around the feed rolls or cause the drive rolls to slip with respect to the wire, thus stalling the wire feed or causing it to feed in an erratic manner. Where serrated rolls are used, slippage of the drive rolls with respect to the wire may cause the drive rolls to mill the wire.

When the wire is pulled, the excessive drag may cause the wire to break in tension, slip or stall the wire feed system, or cause the rolls to mill the wire. The feed problem is further aggravated where small diameter wire is used, where exceptionally soft wire or exceptionally stiff wire is used, or where bends in the wire guide means cause excessive loading.

In the past, one possible solution to the wire feed problem under difficult conditions has been to use both a push and a pull means for feeding the wire. The push means were located near the wire reel and the pull means at some point between the push means and the arc. However, these systems introduced some problems of their own. The two wire feed systems should both feed at exactly the same rate. If the push means is even slightly faster than the pull means, the wire may collapse in column or the drive rolls may slip. Where the puller motor is even slightly faster than the push means and the usual type of motor is used, the wire may break in tension or the drive rolls may slip. Where the drive rolls slip, the wire may alternately feed at the speed of the push and then of the pull means.

The problem is still further aggravated if any attempt is made to vary the wire feed speed since it is very difficult to match the speeds of two drive systems as presently available over any appreciable range. Thus, a conventional push-pull system is not as satisfactory as it might seem to be at first glance.

The present invention is predicated on the discovery that consumable electrode wires can be fed successfully at desired welding speed over unusually long lengths, e.g. in excess of 50 ft. as contrasted to a maximum of about 17 ft. with presently available systems, by providing a system including both a push means and a pulling means with the proviso that one means have good speed-load characteristics and the other means have poor speed-load characteristics.

A first drive means with the good speed-load characteristics applies a motive force to the wire that varies with the load changes in the system to maintain the wire feed speed constant. For example, if a motor is used as the first drive means, as the load in the system changes due to changes in friction forces between the wire and conduit walls, the torque of the motor and thus the force on the wire will change in a corresponding way to either increase or decrease the force necessary to keep the wire speed constant. Thus, for purposes of this disclosure, the term "good speed-load characteristics" is used to describe a drive means which applies a varying force to the wire as the load in the system varies to keep wire feed speed free from undesirable fluctuations.

A good speed load characteristic is an essentially horizontal line on a speed vs. load graph. Such a curve is said to have a slope of zero. This means that the speed is practically constant at all loads. In practice, it is difficult to achieve a constant speed at all loads. Therefore, changes in speed of about ±5% are acceptable for most applications. In some welding applications where weld requirements are not critical, changes in speed as great as 10 percent can be tolerated. Any drive means which has this type of speed-load relationship has a good speed-load characteristic for the purpose of this disclosure.

The other drive means in the system must have poor speed-load characteristics or the equivalent thereof. That is, the speed of the drive means must decrease as the load on it increases. A poor speed-load characteristic is a curve which has a slope of greater than the maximum slope permissible for a good speed-load characteristic. Conventionally, such a curve is said to be a "drooping" characteristic as opposed to the essentially horizontal line which is indicative of a good speed-load characteristic.

It is accordingly an object of this invention to provide a more satisfactory wire feed system.

It is a further object to avoid the necessity of matched speed motors in a push-pull wire feed system.

It is a still further object to employ the push motor to control wire feed rate and to employ the pull motor merely to keep tension on the wire.

According to the invention, there is provided a wire feed apparatus for use with a consumable wire electrode arc welding torch and a remotely located wire reel which comprises a first driving means for pushing the wire and a second driving means for pulling the wire located intermediate of the first driving means and the arc. In a preferred embodiment, two drive means are used having speed-load characteristic such that the first drive means controls the wire feed speed and the second means tends to maintain the wire in tension between the two drive means.

Other objects and advantages will be apparent from the description and drawing in which reference characters differing by a prime refer to like parts and in which:

FIGURE 1 is a schematic of one embodiment of the invention;

FIGURE 2 is a schematic of another embodiment;

FIGURE 3 is a schematic diagram of an exemplary system for practicing the invention;

FIGURE 4 is a view partly in cross-section of an exemplary torque limiting device which is used to provide poor speed-load characteristics;

FIGURE 5 illustrates a circuit for removing power from the push means before it is removed from the pull means;

FIGURE 6 ilustrates a circuit which combines the features of the circuits shown in FIGURE 3 and FIGURE 5; and FIGURE 7 illustrates another system for practicing the invention.

A solution to the push-pull problem is to have one of the wire drive means with a good speed-load regulation sufficient to meet the process requirements and the other drive means with a relatively poor speed-load regulation. In such a system, the wire drive means with good regulation determines the wire speed and the drive means with the poor regulation serves to assist in feeding the wire but it does not determine the wire feed speed.

In practice, it has been found that the best results are obtained when the drive means with the good regulation is made the push unit and the drive means with the poor regulation is made the pull unit. This arrangement tends to put the wire between the two drive units in tension which provides the smoothest feed. This is because the drive means with the poor regulation does not develop enough torque to cause a speed change of the well-regulated drive means. Therefore, if the drive means are properly chosen the torque of the pull means will exert tension on the wire but cannot change the speed of the push means.

While a preferred embodiment to be described hereinbelow includes a push unit with good speed-load characteristics or regulation and a pull unit with poor speed-load characteristics or regulation, it is possible to operate with a pull unit having good speed-load regulation and a push unit with poor speed-load regulation.

An example of such a modification includes wire packed in a storage means in such a manner that the wire tends to feed itself from the storage means. The speed with which the wire feeds from the storage means varies with the forces tending to prevent the wire from feeding out of such storage means. This type of wire source is the equivalent of drive means having a poor speed-load characteristic and is the push unit. Utilizing a system where the wire is packed in such a manner that it tends to evolve on its own so that the wire itself is the push unit, then the pull unit must have good speed-load characteristics sufficient to meet the process requirements. The pull unit may be positioned anywhere between the source of wire (push unit) and the point of use.

The wire feed means can be actuated by electric, hydraulic, pneumatic, or other means. Most present day single driving means wire feed systems make use of electric motors as the wire drive means. These motors utilize either one of two major arc control systems.

In one system, the wire is fed to the arc at a substantially constant rate to meet the process requirements. With this system, it is usually possible to adjust the speed of the motor and in general the speed-load regulation of the wire feed motor is fairly good.

In another control system, the so-called voltage control system, the speed of the motor is controlled in a manner such as to maintain a substantially constant voltage across the arc. In this system, the motor speed may be continuously varying in a manner such as to maintain a substantially constant arc voltage.

Either one of the above systems can be used to control the drive means with good speed-load regulation provided that in the speed control system such means maintains good speed control and that in the voltage control system such means feed the wire at speeds which maintain substantially constant arc voltage.

In the preferred mode of operation, the pull means must have poor speed-load characteristics. Such a means may be obtained in several ways, for example, a series motor or a shunt motor with a ballast resistor or other means for limiting the motor current regardless of motor load or speed is one means of obtaining the desired poor speed-load characteristics. Another means is a high slip induction motor. Still another means is to use electrical or mechanical slip clutches or other slip means to obtain the desired regulation. Any means of obtaining the desired droop in speed-load characteristics is within the scope of this invention.

The push motor is operated at a speed such as to deliver the wire to the arc at the desired rate and it determines the wire feed speed of the push-pull system. It pulls the wire from the wire storage means such as rod reel, spool, pay-off pack, etc., and pushes it through the wire guide means towards the arc.

The torque-type pull motor, that is, one having poor speed-load characteristics, has a no-load speed which is higher than the desired wire speed. The load imposed on it by the push motor feeding wire to it, slows it down to the desired wire feed speed. For applications where the size of the pull motor is limited and the pull motor does not have sufficient power by itself to pull the wire from the wire storage means through the wire guides and into the arc, the wire feed speed is obviously determined by wire push means.

Where there is no limitation on the size of the pull motor, it might have enough power under some conditions to tend to pull the wire from the wire storage means without any assistance from the push motor in spite of the slope of its speed-load characteristics. In such a case, it could take control of the wire feed speed. This would be undesirable because its poor speed-load characteristics would cause undesirable fluctuations in the wire feed speed as load conditions change. In such a case, it is desirable to have the push means equipped with some means to prevent it from being overhauled by the pull means. One such means is to have the push means equipped with a worm and worm gear reduction with a ratio high enough to cause it to lock on an overhauling load and thus limit the wire feed speed to the speed of the push motor. However, in all but situations where very heavy wire is being fed, this situation can be obviated by choosing a pull motor with less torque. The exact location of the push and pull means depends on the intended use.

Referring to the drawings, FIGURE 1 shows one embodiment of the invention ideally suited for feeding heavy wires. In this figure, the push means 10 is located near the wire supply means 12. Where fairly heavy wire is to be moved over a considerable distance, the pull means 14 can be located close to the arc or it can be located somewhere along the wire guide means 16 so as to act as a "pumping station" as shown in FIGURE 1. In this case, more than one puller unit can be used.

For driving small wires, it is desirable to have the pull motor 14 located on or near the torch or hand gun 20 as shown in FIGURE 2.

Where a hand gun with a motor mounted thereon is used, it is desirable to have the pull motor as small and as light as possible so as to make the hand gun easy to handle. This is not the limitation that it might seem to be since a relatively small amount of pull power is required to secure satisfactory feeding of the wire.

When feeding small, low column strength wires it is desirable to have the pull means start simultaneously or ahead of the push means and to have the pull means stop simultaneously or after the push means stops. If at any time the wire push means is acting on the wire when the wire pull means is not acting on the wire, the wire may collapse or jam. The proper sequencing can be obtained by means of suitable circuitry, as will be described hereinbelow.

Having described the invention generally, the following is a description of the preferred embodiment of the invention from which one skilled in the art will be able to understand and practice the method of the invention.

FIGURE 3 illustrates the preferred embodiment for practicing the invention. In this figure, the wire push means having good speed-load regulation includes a shunt wound D.C. motor 10'. The motor shunt field is connected to the field supply contained in an electronic governor 30 by means of leads 31 and 32. Governor 30 has a speed adjusting means 35. The motor armature is connected to the electronic governor by means of leads 33 and 34. A switch 61 which is in lead 34 is used to start and stop motor 10'. The electronic governor is energized by 115 volts A.C. input. With this arrangement, the motor 10' will run at any speed for which the means 35 is set and it will maintain that speed with good regulation regardless of the load applied to the motor 10'.

In a system wherein the push means, for example motor 10, is responsive to arc voltage, the electronic speed control 30 would be replaced by a voltage control provided with an arc voltage selector.

The wire pull means having poor speed-load regulation includes a permanent magnet shunt-wound motor 14'. Variac-type transformer 38, whose input is 115 volts A.C., has an output which can be adjusted to any desired value between 0 and 115 by means of slider 42. A rectifier 37 rectifies the A.C. output voltage of transformer 38 and feeds the resultant D.C. to the motor 14' through armature leads 39 and 40. Swith 62, which is in lead 40, is used to start and stop pull motor 14'. With only the elements described above, motor 14' could still have better speed-load regulation than is desirable for the purposes of this invention. This good speed-load regulation is overcome by inserting adjustable resistor 36 in one of the armature leads. This circuit takes the speed-load regulation poorer in the following manner:

With a constant load on motor 14', the motor will run at a constant speed determined by the output voltage of 38 and the setting of 36. However, if the load on motor 14' is increased, its armature current will also increase and as the armature current increases the voltage drop across resistor 36 increases, thus reducing the armature voltage applied to leads 39 and 40. Since it is characteristic of a shunt motor to operate at a speed dependent on the voltage applied to its armature, it is obvious that the motor speed will drop as the load is increased and that the rate of the speed drop is determined by the value of resistor 36. In practice, resistor 36 is adjusted to give the desired drop in the speed-load characteristics and then 42 is adjusted so that the no-load speed of motor 14' is faster than the speed at which it will operate when it is pulling wire.

In order to transmit power to the pull means before it is applied to the push means on starting the wire feed operation, a circuit is provided which includes a switch 63 for starting and stopping the operation. Also included in the circuit is a relay 65 which actuates switch 62 found in lead 40 to motor 14'. Another relay 64 of the time delay type which closes its switch 61, found in lead 34 to motor 10', at a predetermined time after relay 64 is energized but which opens its switch immediately on de-energization is provided. Thus, when switch 63 is closed to start the operation, relay 65 is energized closing its switch 62, thus energizing the pull means. Closing switch 63 also simultaneously energizes time delay relay 64 and after a predetermined time delay closes switch 61, thus energizing the push means. When switch 63 is opened to stop the operation, both 64 and 65 are simultaneously de-energized, thus simultaneously opening their respective switches 61 and 62, and simultaneously stopping both the push and pull wire feed means.

FIGURE 5 shows an alternative circuit which can be used with the wire push means and wire pull means. In this circuit, switch 163 is the same as in FIGURE 3, namely, it is used to start and stop the operation. However, in this circuit, a relay 68 actuates switch 161 which is positioned in lead 34 to motor 10'. Relay 66 which actuates switch 162 positioned in lead 40 to motor 14' is a time delay relay of the type which closes its switch immediately on energization but opens its switch only after a predetermined time after de-energization. When switch 163 is closed, it energizes relay 68 which in turn closes switch 161, starting the wire push motor. Simultaneously, time delay relay 66 is energized closing switch 162, thus stopping the pull motor.

When switch 163 is opened, it de-energizes relay 68, thus opening switch 161 stopping the push motor and simultaneously de-energizes time delay relay 66. After a predetermined time interval, time delay relay 66 opens switch 162, thus stopping the pull motor.

Another alternative is shown in FIGURE 6. This circuit combines the two time delay relays found in FIGURE 3 and FIGURE 5. Switch 263 is again used to start and stop the operation. Time delay relay 266 is of the type which operates its switch 261 a predetermined time after it is energized but opens this switch immediately when it is de-energized. Time delay relay 264 is of the type which closes its switch 262 immediately upon energization but which maintains this switch closed for a predetermined time upon de-energization. Thus, when switch 263 is closed, time delay relay 264 is energized and closes its contact 262, thus energizing the pull motor. Closing switch 263 also simultaneously energizes time delay relay 266 which closes its switch 261 a predetermined time later and thus energizes the push means. When switch 263 is opened to stop the operation, it de-energizes time delay relay 266 and immediately opens its switch 261, thus de-energizing the push motor. Opening switch 263 also simultaneously de-energizes time delay relay 264 which opens its switch 262 after a predetermined time delay, thus de-energizing the pull means.

An example of a torque limiting device which can be used in place of a pull motor having a drooping speed-load characteristic is shown in FIGURE 4. This device includes a drive shaft 41 having a shoulder 47 and a threaded portion 41a. The shaft 41 is mounted in a support 50 through bearing 51. One face of shoulder 47 prevents it from moving axially to the left and washer 52 and lock ring 53 prevent the shaft from moving axially to the right. A drive roll 43 is mounted on the shaft. Washer 44 presses against the face of drive roll 43 with a pressure determined by the constants of spring 45 and the setting of adjustment nut 49 and washer 48. Thus, drive roll 43 is frictionally connected to shaft 41. Shaft 41 is connected to a pull motor by means of 46 which can be any suitable coupling means including a flexible cable. Shaft 41 is rotated at a speed such that drive roll 43 tends to drive the wire faster than the push motor will permit it to go. This will, of course, put a tension on the wire between the push and pull means which in turn puts a load on drive roll 43. When this load reaches the desired value, the drive roll 43 will tend to slip with respect to shaft 41. The amount of pull which the drive roll 43 will apply to the wire before it starts to slip is determined by the setting of adjustment nut 49. If this nut is tightened so as to further compress the spring, it will apply more frictional coupling to the drive roll 43, thus increasing the amount of tension in the wire. With this torque-limiting device, it is no longer necessary that the pull motor have a poor speed-load characteristic. As a matter of fact, it is possible to couple the push motor which has a good speed-load characteristic to shaft 41 through coupling means 46 and still have the desired tension in the section of wire between the push and pull feed rolls.

FIGURE 7 illustrates another modification for practicing the invention. In this figure a single motor 70 having a constant speed-load characteristic is used as the pushing means. The same motor has a second shaft 71 to which is connected flexible cable 72 which in turn drives a slip device 73. A slip device provides the poor speed-load characteristic and is used as the pulling means.

What is claimed is:

1. A wire drive system for feeding consumable electrode welding wire from a remotely located source of such wire to a consumable wire electrode arc welding torch which comprises a first wire feed means and a second wire feed means, one of said means having a relatively good speed-load characteristic such that the forces exerted by said means on the wire are sufficient to determine the wire feed speed and the other of said means having poor speed-load characteristics.

2. A push-pull wire drive system for feeding consumable electrode welding wire from a remotely located source of such wire to a consumable wire electrode arc welding torch which comprises a push motor having good speed-load characteristics located adjacent to said source of consumable wire such that the torque created by said push motor determines wire feed speed and a pull motor having poor speed-load characteristics located at the arc welding torch.

3. A wire drive system for feeding consumable electrode welding wire from a remotely located source of such wire to a consumable wire electrode arc welding torch which comprises a push unit having poor speed-load characteristics and a pull unit having good speed-load characteristics located between the push unit and the arc welding torch so that the pull unit will impart a force to the wire sufficient to determine the wire feed speed.

4. A push-pull wire drive system for feeding consumable electrode welding wire from a remotely located source of such wire to a consumable wire electrode arc welding torch which comprises a push motor having relatively poor speed-load characteristics located adjacent to said source of consumable wire and a pull motor having relatively good speed-load characteristics located at the arc welding torch so that the torque created by the pull motor is sufficient to determine the wire feed speed.

5. A push-pull consumable electrode wire feed system comprising a push means having good speed-load characteristics including a shunt-wound motor, a speed governor connected in circuit relation with said shunt-wound motor, the torque created by said push means being sufficient to determine the wire feed at desired speed, a pull means having poor speed-load characteristics including a motor connected in a circuit which comprises a transformer, a rectifier connected on one side across the output of said transformer, and on the other side to the armature of said motor and a resistor connected in series between said rectifier and said motor.

6. A push-pull wire drive means for feeding wire from a remotely located reel to a consumable wire electrode arc welding torch which comprises a pushing means located adjacent the wire reel having a relatively constant speed-load characteristic, so that the forces imparted to the wire by said push means is sufficient to determine the wire feed rate, at least one pulling means located intermediate of the pushing means and the arc welding torch and having a dropping speed-load characteristic.

7. The apparatus set forth in claim 6 wherein a wire guide means is included between the pusher means and the welding torch.

8. A push-pull wire feeding apparatus for use with a consumable wire electrode arc welding head and a remotely located wire reel having guide means for said wire electrode between the head and the reel which comprises a first driving means located adjacent the wire reel for pushing the wire through the guide means and having a constant speed-load characteristic and at least one pulling means located intermediate of the pushing means and the arc welding head having a drooping speed-load characteristic such that the torque created thereby maintains the wire between the pushing and pulling means in tension but cannot alter the speed of the first driving means which determines the wire feed rate.

9. A device as set forth in claim 8 wherein the pulling means is located on the arc welding head.

10. A device as set forth in claim 8 wherein the pulling means is located about half way between the arc welding head and the reel.

11. The device as set forth in claim 8 wherein both the pushing and pulling means are powered from a single motor, the pulling means being driven through a torque limiting device which transmits enough torque to maintain the wire in tension.

12. The device set forth in claim 8 wherein the motor pulling means includes a high slip induction motor.

13. A device as set forth in claim 8 wherein said first drive means and said pulling means comprise separate electric motors.

14. A push-pull wire drive means for feeding wire from a remotely located reel to a consumable wire electrode arc welding torch which comprises a pushing means having good speed-load characteristics located adjacent the reel, the instantaneous speed of said pushing means being responsive to the arc voltage and at least one pulling means located intermediate of the pushing means and the arc welding torch having a drooping speed-load characteristic.

15. A push-pull wire drive system for feeding wire from a remotely located reel to a consumable wire electrode arc welding torch which comprises a pushing means located adjacent the wire reel and having a relatively constant speed-load characteristic, at least one pulling means located intermediate of the pushing means and the arc welding torch and having a drooping speed-load characteristic such that the pushing means determines the wire feed speed and the pulling means serves to maintain the wire in tension and a circuit for transmitting power to the pulling means before the pushing means upon initial starting up to insure tension in the wire.

16. A push-pull wire drive system for feeding wire from a remotely located reel to a consumable wire electrode arc welding torch which comprises a pushing means located adjacent the wire reel and having a relatively constant speed-load characteristic, at least one pulling means located intermediate of the pushing means and the arc welding torch and having a drooping speed-load characteristic such that the pushing means determines the wire feed speed and the pulling means serves to maintain the wire in tension and a circuit for removing power from the pushing means before it is removed from the pulling means when the device is stopped.

17. A push-pull wire drive system for feeding wire from a remotely located reel to a consumable wire electrode arc welding torch which comprises a pushing means located adjacent the wire reel and having a relatively constant speed-load characteristic, at least one pulling means located intermediate of the pushing means and the arc welding torch and having a drooping speed-load characteristic such that the pushing means determines the wire feed speed and the pulling means serves to maintain the wire in tension and a circuit for transmitting power to the pulling means before the pushing means on starting and to remove power from the pushing means before the pulling means on stopping.

References Cited by the Examiner
UNITED STATES PATENTS

| | | | |
|---|---|---|---|
| 1,927,896 | 9/1933 | Meller | 314—72 |
| 2,719,245 | 9/1955 | Anderson | 219—130 |
| 2,790,925 | 4/1957 | Landis et al. | 314—69 |
| 2,900,488 | 8/1959 | Bassot | 219—130 |

JOSEPH V. TRUHE, *Primary Examiner.*